May 26, 1931.  F. H. CROSS ET AL  1,806,788
COUPLING DEVICE
Filed Jan. 12, 1928

Inventors
F. H. Cross
and
G. J. Ruf
By C. F. Heinkel
Attorney

Patented May 26, 1931

1,806,788

UNITED STATES PATENT OFFICE

FRANK H. CROSS, OF CLEVELAND, AND GEORGE J. RUF, OF CLEVELAND HEIGHTS, OHIO

COUPLING DEVICE

Application filed January 12, 1928. Serial No. 246,133.

Our invention relates to coupling devices generally and more particularly to associable and separable coupling devices.

One object of our invention is a simple, inexpensive, efficient, and easily operable coupling device the parts of which can be associated and separated easily and quickly and are self aligning when associated and complete a sealing means between the parts when associated and are rotatable in relation to each other when associated. Other objects will appear, or become apparent or obvious, or will suggest themselves upon an inspection of the accompanying drawings and in the description of the device shown in the same.

In coupling devices it is quite desirable that the parts thereof be easily associated or assembled to complete a joint and easily separated to break a joint; that the parts are in alignment with each other when the joint is made; that the parts remain in alinement when a transverse force acts on one or both of the parts; that there is an effective sealing means between parts when the joint is made; and that parts can be rotated in relation to other parts. Our invention aims to provide these desirable features by the most simple means and thereby eliminate considerable trouble and inconvenience and loss of time in making and breaking coupling connections and reduce the cost of production of couplings.

In the accompanying drawings:—

Similar reference characters refer to similar parts throughout the views pertaining to each other.

Figure 1:
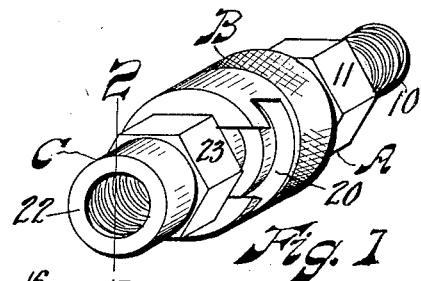
Fig. 1 is a general perspective view of an assembled coupling device embodying our invention in one form and shows a base member having a threaded male end and a companion member having a threaded female end as associated with each other.
Figure 2:
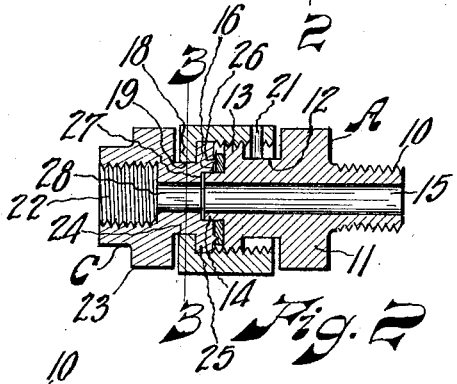
Fig. 2 is a longitudinal section taken in a plane indicated by the line 2—2 in Fig. 1 to show relations of the parts more clearly in a longitudinal plane.
Figure 3:
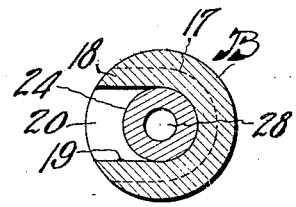
Fig. 3 is a transverse section taken in a plane indicated by the line 3—3 in Fig. 2 to show the side entrance feature more clearly.

The base member A has the threaded male end 10, the hexagonal portion 11 to take hold of the member A for rotating or rotation preventing purposes, the neck portion 12 adjacent to the portion 11, the externally threaded portion 13 adjacent to the neck, the part or nose portion 14 of the aligning element adjacent to the portion 13, and the hole 15 longitudinally through the member A. The washer 16, a part of the sealing means for the coupling, of leather or other material suitable for such a means, is mounted on the part 14 but does not completely fill the same longitudinally so that the outer end thereof projects beyond the end of the washer to form a nose for another part of the aligning element as will be described later; the outer circumferential edge of the washer being free and unconfined.

Figure 4:
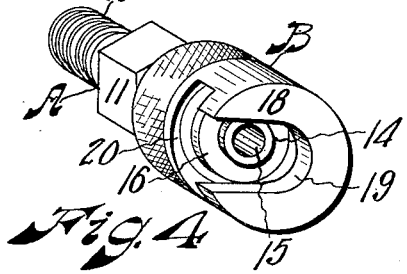
Fig. 4 is a general perspective view of the base member with the cap thereon as separated from the companion member.
Figure 5:
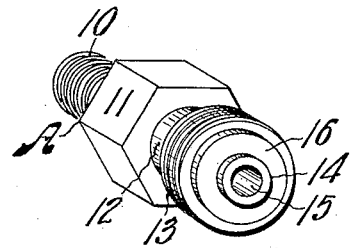
Fig. 5 is a general perspective view of the base member individually.

The cap or coupling member B is threaded onto the portion 13 of the member A and has the recess 17 and the flange 18. The recess 17 is open at one side of the cap to the full diameter of the recess and the flange 18 is cut away at the same side to the full diameter of the hole 19 through the same and is parallel with the open side of the recess 17 so that a sort of T slot 20 is formed thereby which opens at one side of the cap to provide an entrance means for another member of the device as will be described later. The pin 21 is driven into the cap in such a position and to such a distance that the inner end thereof extends to the surface of the neck 12 which is provided for that purpose and is located between the portions 11 and 13 so that the cap always remains associated with the base member as seen in Fig. 4 but can rotate in relation to the same. A portion of the cap is knurled to facilitate rotation of the same although other means can be used for the same purposes.

The companion member C has the threaded female end 22, the hexagonal portion 23 to take hold of the member C for rotating or rotation preventing purposes, the neck 24 adjacent to the portion 23, the flange 25 adjacent to the neck, the annular sealing projection 26 having the seat thereof formed in the washer 16 and forming another part of the sealing means mentioned previously and extending outwardly from the outer face of the flange, the countersink 27 forming another part of the aligning element previously mentioned and extending inwardly of the outer face of the flange, and the hole 28 longitudinally through the member C and opening into the internally threaded portion of the end 22.

The flange 25 of the member C fits loosely into the recess 17 of the cap and the neck 24 of the member C fits loosely into the hole 19.

Since the entrance opening (T slot 20) is of the same size as the recess 17 and the neck 24 fits loosely into the hole 19 and since the recess and the hole are open at one side of the cap, the members can be associated by a sidewise movement between the same when the flange 25 and the neck 24 are entered sidewise through the slot 20 and pushed inwardly in this slot until the neck 24 abuts the curved wall of the hole 19 or the flange 25 abuts the curved wall of the recess 17, or both, and thereby, at least approximately, align the members in relation to each other. Therefore, the members can be associated with or separated from each other by a sidewise movement between the same.

In order to attain and to retain alignment between parts, the neck 24 is made diametrically small in relation to the diameter of the flange 25. This structure provides not only a large contact surface between the parts B and C and thereby maintain a better and more lasting joint structure but also permits of the slot 19 to be made comparatively small and the slot 20 comparatively large so that as little as possible of the flange 18 is cut away and thereby preserve as much as possible of the flange 18 to contact as much as possible of the flange 25 so that as much as possible uninterrupted contact can be had all around between the parts B and C and thereby eliminate as far as possible the weakness of such a joint at the necessary open side thereof.

A joint structure in which a portion of the contact faces are cut away at one side is always weak at that side and provides much tendency to leak at that side and this tendency increases with the width of the cut since the parts can separate at that cut away side; therefore, a joint with a small neck and a large flange contacting as much as possible of the companion flange, as far around as possible, as disclosed herein, eliminates leakage as far as possible.

When the members are associated, the cap B and the member A are rotated in relation to each other whereupon the threaded engagement between the cap and the member A produces a longitudinal movement between these members according to the direction of the rotation and the lead of the thread.

When this rotation is effected in one direction, the flange 18 engages the flange 25 and moves the member C toward the member A and thereby causes the nose 14 to enter the countersink 27 and thereby centralize or align the members A and C and complete the aligning element between the members so that the holes through the same will come into alignment.

The washer 16, itself a sealing washer as shown by having flat contact faces with both members A and B is supported on the inner portion of the nose 14 and on the outside thereof. The outer edge of the washer is free so that the washer can expand or contract and is not hampered in any manner.

The front or free end of the nose 14 extends into the countersink 27 and fits closely therein for aligning purposes and thereby forms at least a partial seal between the holes through the members A and B and the washer 16 and thereby seals the washer against free access thereto of substance flowing through the holes mentioned.

Since many substances flowing through such devices are injurious to the material of sealing members, and thereby reduce the life and the efficiency of sealing means, my invention reduces or eliminates the free access of substance in the holes to the sealing washer and thereby prolongs the life of the coupling and increases the efficiency thereof.

While the members A and C are so moved or forced toward each other, the projection 26 contacts the washer 16 and thereby completes the sealing means between these members as one is forced against the other.

When the members are so associated, the member C can be rotated since the aligning element and the sealing means are all round and concentric with the members A, B and C so that a rotative movement between members affects neither the alignment nor the sealing means between the members.

A rotative movement between the members A and B in the opposite direction reverses the movements described above and releases the elements or members so that the same can be separated or disassociated by a sidewise movement between the same as in the association of the same except in a reverse order of procedure.

Figure 7:
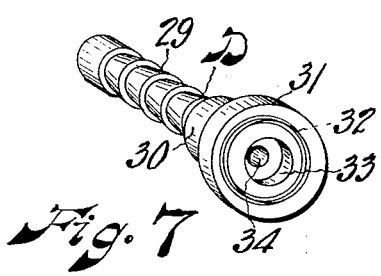
Fig. 7 is a general perspective view of a different companion member associable with or attachable to the base member of Fig. 1 and having a shank for a hose connection.
Figure 6:
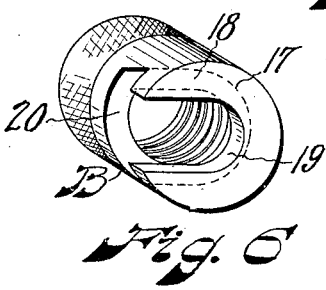
Fig. 6 is a general perspective view of the cap individually.

The member D, illustrated in Fig. 7 to show how differently formed members may be associated with a base member, has the end 29 corrugated for better attachment of a hose thereon, the neck 30 adjacent to the end 29 and of the same size and for the same purpose as the neck 24, the flange 31 adjacent to the neck 30 and of the same size and for the same purpose as the flange 25, the part 32 of the sealing means on the outer face of the flange 31 and of the same size and for the same purpose as the part 26, the countersink 33 in the outer face of the flange 31 and of the same size and for the same purpose as the countersink 27, and the hole 34 longitudinally through the member D.

The member D can readily be substituted for the member C as described above. Likewise, any number of companion members, either functional or structural duplicates or functionally and/or structurally different can be provided with the connecting means described in the last paragraph so that any number of members can be associated individually and successively with the base member or separated from the same.

The device shown and described provides a simple means to effect a coupling between members since the coupling operation is effected sidewise and, therefore, is very easy of accomplishment and the members are automatically aligned with each other and a seal is automatically effected between the members while the same are being associated and automatically released while the members are being disassociated or separated.

We are aware that our invention is applicable to devices other than the one shown and described and that changes can be made in the structure and in the arrangement of the elements of the device shown and described within the scope of the appended claim; therefore, without limiting ourselves to the precise application of our invention nor to the precise structure and arrangement of elements as shown and described.

We claim:—

A sidewise coupling and uncoupling device including a base member, a companion member adapted for endwise coupling onto said base member, and a cap threaded onto said base member and engaging said companion member and being partly open sidewise for coupling said members; said base member having a radially open groove therein and said cap having a pin extending into said groove to retain said cap on said base member and being permanently fixed in said cap to prevent removal of said cap; said groove extending all the way around said base member and being of sufficient width to permit the extending part of said pin to be rotated all around on said base member and to move longitudinally of the device according to needs during coupling and uncoupling of said base and companion members.

In testimony of the foregoing we affix our signatures.

FRANK H. CROSS.
GEORGE J. RUF.